(12) United States Patent
Kamenov et al.

(10) Patent No.: US 8,333,506 B2
(45) Date of Patent: Dec. 18, 2012

(54) LAMINATED TEMPERATURE SENSOR

(75) Inventors: Chavdar Kamenov, Sofia (BG); Petar Mitsev, Sofia (BG); Peter Tilmans, Ieper (BE); Jos Rennies, Ieper (BE)

(73) Assignee: MELEXIS NV Microelectronic Integrated Systems, Ieper (BE)

( * ) Notice: Subject to any disclaimer, the term of this patent is extended or adjusted under 35 U.S.C. 154(b) by 611 days.

(21) Appl. No.: 12/512,837

(22) Filed: Jul. 30, 2009

(65) Prior Publication Data
US 2010/0034237 A1 Feb. 11, 2010

(51) Int. Cl.
*G01K 7/00* (2006.01)
*G01K 3/00* (2006.01)

(52) U.S. Cl. .......... 374/185; 374/110; 374/166; 338/25; 338/22 R

(58) Field of Classification Search .................. 374/185, 374/166, 110; 338/25, 22 R
See application file for complete search history.

(56) References Cited

U.S. PATENT DOCUMENTS

| | | | |
|---|---|---|---|
| 4,901,051 A * | 2/1990 | Murata et al. | 338/25 |
| 5,172,466 A * | 12/1992 | Friese et al. | 29/612 |
| 5,795,545 A * | 8/1998 | Koripella et al. | 422/94 |
| 5,823,680 A * | 10/1998 | Kato et al. | 374/185 |
| 6,140,906 A * | 10/2000 | Kaihara et al. | 338/22 R |
| 6,278,379 B1 * | 8/2001 | Allen et al. | 340/870.16 |
| 6,406,181 B1 * | 6/2002 | Mueller et al. | 374/185 |
| 6,435,005 B1 * | 8/2002 | Kikuchi et al. | 73/25.01 |
| 2002/0075129 A1 * | 6/2002 | Mizoguchi et al. | 338/25 |
| 2003/0119196 A1 * | 6/2003 | Chen et al. | 436/136 |
| 2005/0169344 A1 * | 8/2005 | Hutter et al. | 374/14 |
| 2008/0025366 A1 * | 1/2008 | McBurney | 374/44 |
| 2009/0066472 A1 * | 3/2009 | Kondo | 338/34 |
| 2009/0173526 A1 * | 7/2009 | Kloiber et al. | 174/260 |

* cited by examiner

*Primary Examiner* — Mirellys Jagan
(74) *Attorney, Agent, or Firm* — Kilpatrick Townsend & Stockton LLP

(57) ABSTRACT

A temperature sensor is formed from three initially unfired (or green) ceramic substrates. The first substrate has a temperature sensitive means printed on a first surface. Additionally first and second conducting elements are also printed thereon. The third substrate has a temperature sensitive means in the form of a resistor printed on a first surface. Additionally first and second conducting elements and are also printed thereon. The second substrate is provided with a conducting via in the form of a hole extending through the substrate, the hole being filled with conductive material. The via is adapted to be aligned with the ends of conducting elements. To construct the sensor the first surfaces of substrates are aligned with substrate such that via is aligned with conducting elements. The substrates are then pressed together. Subsequently the substrates are fired to provide the completed sensor.

8 Claims, 4 Drawing Sheets

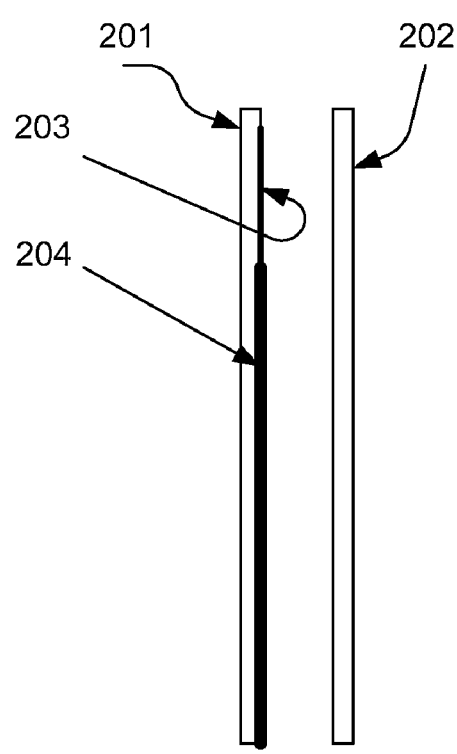
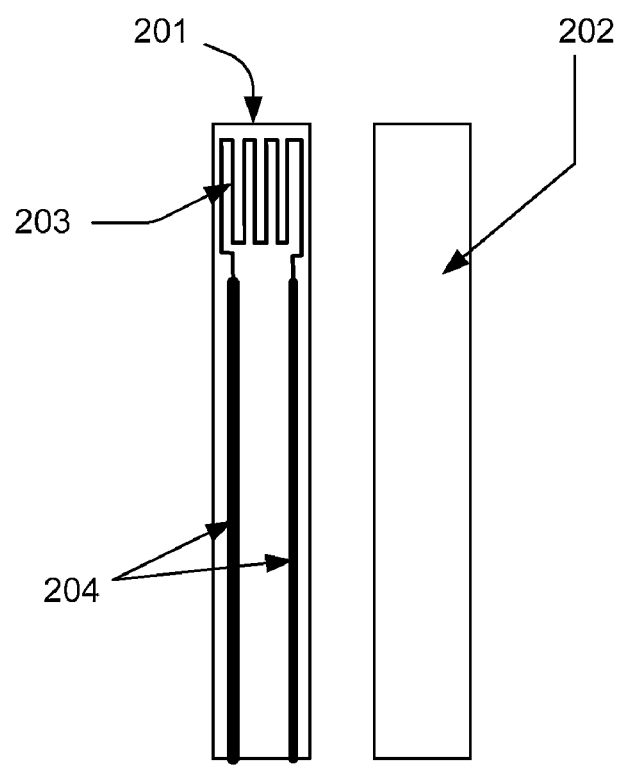
Figure 2A                    Figure 2B

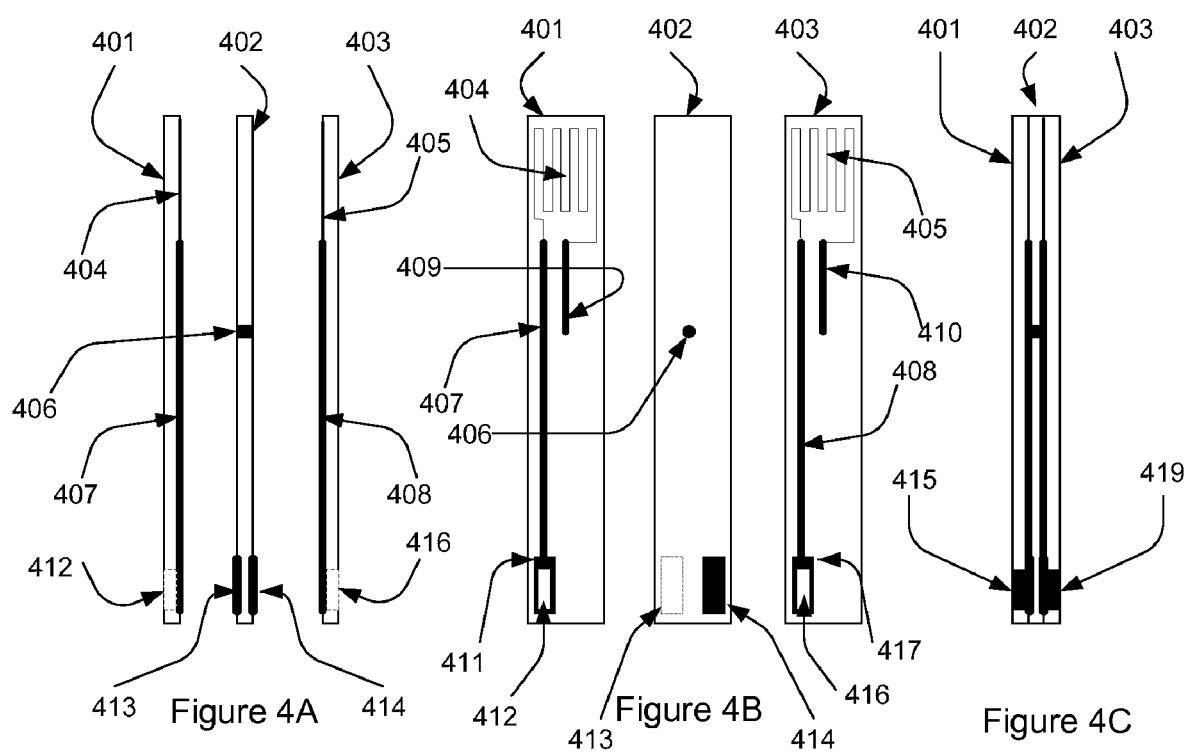

LAMINATED TEMPERATURE SENSOR

CROSS-REFERENCES TO RELATED APPLICATIONS

This application claims priority to UK Patent Application No. 0814452.9, filed on Aug. 7, 2008, which is hereby incorporated by reference in its entirety for all purposes.

BACKGROUND

The present invention relates to a temperature sensor and in particular to a temperature sensor adapted for use in vehicular exhaust systems.

Modern control systems for automotive engines require measurement of the temperature and pressure in the vehicle exhaust system. Accurate measurements of the temperature and pressure of the exhaust system are increasingly important with the desire to improve engine efficiency and reduce exhaust gas emissions and pollutants. As the high temperature environment within an exhaust tailpipe is somewhat hostile, sensors capable of operating in this environment need to be specially adapted.

A typical temperature sensor according to the state of the art comprises a substrate upon which a conducting pattern is provided and a temperature sensitive means is mounted. Typically, the temperature sensitive means is a resistive or piezo resistive device mounted using flip chip technology to thus provide a temperature sensing assembly. The assembly is also usually coated with a suitable conformal coating to enable it to survive the intended environment. Such a device uses various technologies and is thus not necessarily cheap or convenient to manufacture. Furthermore such a device is not symmetrical and can register different temperatures dependant upon the direction of the airflow.

An alternative form of temperature sensor is realised by printing a temperature sensitive means in the form of a resistor onto a ceramic substrate and then covering the resistor by mounting a second ceramic substrate onto the first substrate to cover at least the resistive element. Such an assembly can be cheaper but is still not symmetrical and thus can still register different temperatures dependant upon the direction of the airflow.

It is desirable to provide a temperature sensor that at least partially overcomes or alleviates the above problems.

BRIEF SUMMARY

According to a first aspect there is provided a temperature sensor comprising: a first ceramic substrate having on a first surface a temperature sensitive means and a pair of conducting surface elements connected to each end of said temperature sensitive means; a second ceramic substrate having at least one conducting via therethrough, said conducting via being aligned with one of said pair of conducting surface elements; and a third ceramic substrate having on a first surface a temperature sensitive means and a pair of conducting surface elements connected to each end of said temperature sensitive means, wherein one of said pair of conducting surface elements is aligned with the conducting via of the second substrate.

According to a second aspect there is provided a method of manufacturing a temperature sensor comprising the steps of: providing a first ceramic substrate having on a first surface a temperature sensitive means and a pair of conducting surface elements connected to each end of said temperature sensitive means; providing a second unfired ceramic substrate having at least one conducting via therethrough, said conducting via being adapted to be aligned with one of said pair of conducting surface elements on said first substrate; providing a third unfired ceramic substrate having on a first surface a temperature sensitive means and a pair of conducting surface elements connected to each end of said temperature sensitive means, wherein one of said pair of conducting surface elements is adapted to be aligned with the conducting via of the second substrate; aligning, pressing together and firing said substrates.

Various Embodiments provide a temperature sensor that can survive in a high temperature environment and a method of manufacturing the same. Furthermore, the cost of manufacturing such sensors is low enough for the automotive market and the sensor can be manufactured with a considerably higher degree of symmetry than prior art sensors.

Preferably the unfired ceramic substrates are pressed together and fired at a temperature of around 1500° C. This may result in a ceramic package stable post firing up to 1500° C., which is ample compared to typical vehicular exhaust temperatures in the region of 900° C.

The substrates may be substantially planar. Preferably, the substrates are substantially elongate having said temperature sensitive means provided at one end. Most preferably, the substrates are each of elongate rectangular form. The conducting via may be provided substantially at the centre of the second substrate. The conducting via may comprise a hole passing through the ceramic substrate said hole being filled with conducting material. Preferably, the conducting material is platinum.

The conducting surface elements may be arranged such that one element of each pair runs substantially from the temperature sensitive means to the distal end of the substrate and the other element, being adapted to be aligned with said conducting via runs from the temperature sensitive means to the middle of the substrate. Preferably, the second element runs substantially along the centre line of the substrate to the middle of the substrate.

The conducting surface elements may be provided with connection pads. The connection pads may be directly exposed or indirectly exposed, for instance, through additional dedicated vias. The additional dedicated vias may be holes provided through the appropriate substrate and may be filled with conducting material after pressing of the substrates. The holes may even be filled with conducting material after firing the substrates.

The connection pads may enable the connection of the temperature sensor to external circuitry. Alternatively, any other suitable adaptations for connection to external circuitry may be provided.

The sensor may additionally incorporate additional circuitry. Such circuitry may be provided any one or more of the first, second or third substrates. The additional circuitry may also be provided with one or more surface conducting elements and/or associated vias to enable a signal to be output to external circuitry.

The temperature sensitive means may comprise one or more resistors having a resistance value affected by the local temperature of the substrate.

Preferably said temperature sensitive means and/or conducting surface elements and/or additional circuitry may comprise conducting material deposited onto said substrates. Most preferably, the deposition is achieved by screen printing. Preferably said conducting material is platinum. Preferably the conductive material and the ceramic material forming the substrates are selected to have compatible temperature coefficients of expansion. This can reduce unwanted and unpredictable strain in the substrate that may affect the accuracy of the measurements.

The manufacture processes may be selected to be compatible with well known low cost ceramic package manufacturing methods and processes. The external shape and dimensions of said sensor may be arranged to be compatible with the handling equipment normally used within the electronics industry for handling ceramic packages.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In order that the invention is more clearly understood one embodiment will now be described farther herein, by way of example only and with reference to the accompanying drawings, in which:

FIG. 2 is a schematic view of an alternative form of temperature sensor for use in a vehicular exhaust system in accordance with the state of the art;

FIG. 4a is an exploded side view of a second embodiment of a temperature sensor according to the present invention;

FIG. 4b is an exploded side by side front view of the components of a second embodiment of a temperature sensor according to the present invention; and FIG. 4c is an assembled side view of a second embodiment of a temperature sensor according to the present invention;

DETAILED DESCRIPTION OF THE INVENTION

Figure 1:
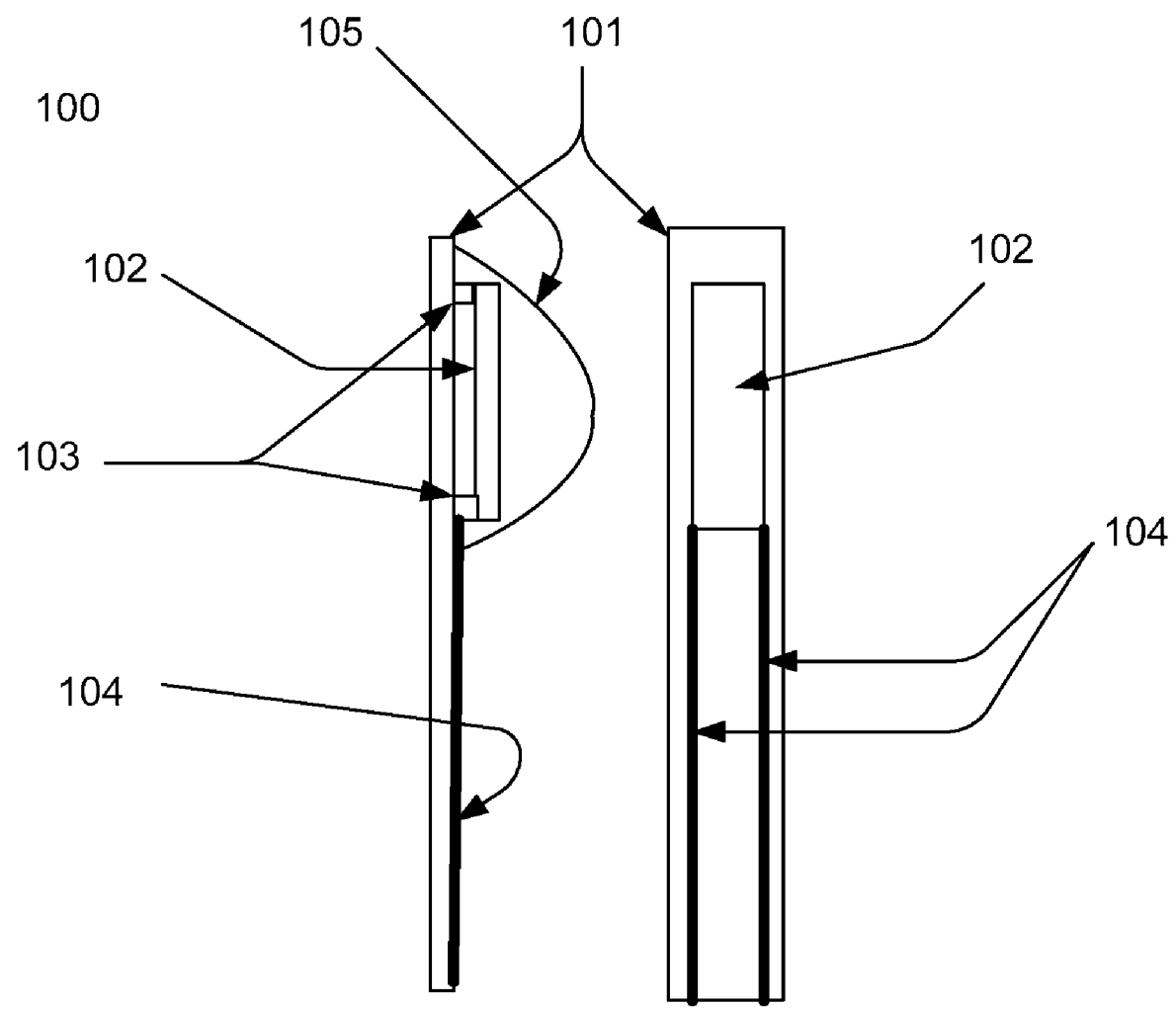
FIG. 1 is a schematic view of a temperature sensor for use in a vehicular exhaust system in accordance with the state of the art.

Turning now to FIG. 1, a first example of a prior art temperature sensor 100 for use in a vehicular exhaust system comprises a substrate 101 upon which a conducting pattern 104 is provided and a resistive temperature sensitive means 102 is mounted. The temperature sensitive means 102 is mounted using flip chip technology 103 to thus provide a temperature sensing assembly. The assembly is coated with a suitable conformal 105 coating to enable it to survive the intended environment. As discussed previously, such a sensor 100 uses various technologies and is thus not necessarily cheap or convenient to manufacture. Furthermore such a sensor 100 is not symmetrical and can register different temperatures dependant upon the direction of the airflow.

Turning now to FIG. 2, an alternative form of temperature sensor 200 is realised by printing a temperature sensitive means 203 in the form of a resistor onto a first ceramic substrate 201 and then covering the resistor by mounting a second ceramic substrate 202 onto the first substrate to cover at least the resistive element 203. Conducting surface elements 204 are provided to enable the resistor 203 to be readily connected to external circuitry. Such an assembly can be cheaper but is still not symmetrical and thus can still register different temperatures dependant upon the direction of the airflow.

Figures 3A, 3B, 3C:
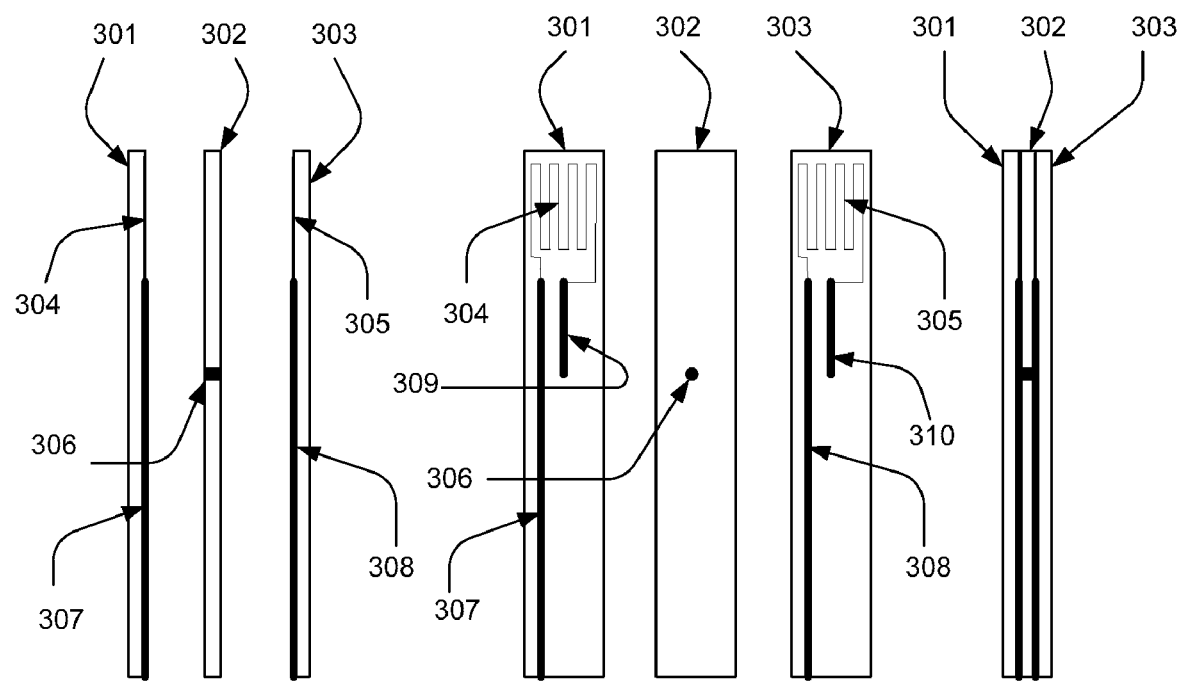
FIG. 3a is an exploded side view of a first embodiment of a temperature sensor according to the present invention.
FIG. 3b is an exploded side by side front view of the components of a first embodiment of a temperature sensor according to the present invention.
FIG. 3c is an assembled side view of a first embodiment of a temperature sensor according to the present invention.

Turning now to FIG. 3, in a first embodiment of the present invention a temperature sensor 300 is formed from three initially unfired (or green) ceramic substrates 301, 302, 303.

The first substrate 301 has a temperature sensitive means 304 in the form of a resistor printed on a first surface. Additionally first and second conducting elements 307 and 309 are also printed thereon. A first end of each of conducting element 307 and 309 is arranged to connect electrically with two points on temperature sensitive means 304. A second end of first conducting element 307 is extended to a position on substrate 301 to enable subsequent external electrical connection to be made thereto. A second end of conducting element 309 is extended to a given position on the substrate 301, typically substantially at the middle point of the substrate 301.

The third substrate 303 has a temperature sensitive means 305 in the form of a resistor printed on a first surface. Additionally first and second conducting elements 308 and 310 are also printed thereon. A first end of each of conducting element 308, 310 is arranged to connect electrically with two points on temperature sensitive means 305. A second end of first conducting element 308 is extended to a position on substrate 301 to enable subsequent external electrical connection to be made thereto. A second end of conducting element 310 is extended to a given position on the substrate 303, typically substantially at the middle point of the substrate 303.

The second substrate 302 is provided with a conducting via 306 in the form of a hole extending through the substrate 302, the hole being filled with conductive material. The via 306 is adapted to be aligned with the ends of conducting elements 309 and 310. As such, an electrical connection can be made from conducting element 307 to conducting element 308 through temperature sensitive means 304, conducting element 309, via 306, conducting element 310 and temperature sensitive means 305 respectively.

To construct the sensor 300 the first surfaces of substrates 301, 303 are aligned with substrate 302 such that via 306 is aligned with conducting elements 309, 310. The substrates 301, 302, 303 are then pressed together. Subsequently the substrates 301, 302, 303 are fired to provide the completed sensor 300.

The resulting sensor can be manufactured at a relatively low cost and is capable of withstanding the conditions in a vehicular exhaust system. Additionally, the sensor is substantially symmetrical and is thus less susceptible to variations in the direction of gas flow. In a preferred arrangement the via 306 is arranged to be at the centre of substrate 302. In this way, substrates 301 and 303 can be of identical form to further reduce manufacturing costs and improve symmetry.

Turning now to FIG. 4, in a second embodiment of the present invention a temperature sensor 400 is formed from three initially unfired (or green) ceramic substrates 401, 402, 403. As above: the first substrate 401 is provided with a temperature sensitive means 404 in the form of a resistor printed on a first surface and first and second conducting elements 407 and 409 printed thereon and connected thereto; the third substrate 403 is provided with a temperature sensitive means 405 in the form of a resistor printed on a first surface and first and second conducting elements 408 and 410 printed thereon and connected thereto; and the second substrate 402 is provided with a conducting via 406 in the form of a hole extending through the substrate 402 and filled with conductive material, the via 306 being aligned with the ends of conducting elements 409 and 410. Similarly, the sensor 400 is constructed by aligning, pressing and firing the substrates 401, 402, 403.

The second embodiment 400 differs in the ends of each substrate 401, 402, 403 and the means provide there for connection to external circuitry.

As can be seen from FIG. 4, on the first sensing element 401 a second end of conducting means 407 is provides a pad 411 arranged to encompass at least part of the edge of an orifice 412. Similarly on the third sensing element 403, a second end of conducting means 408 provides a pad 417 arranged to encompass at least part of the edge of an orifice 416. Correspondingly, the second substrate 402 is provided with pads 413, 414 arranged on opposing sides of the substrate. The pads 413, 414 are positioned so as to align with orifices 412 and 416.

During assembly (or when assembled), orifice 412 aligns with conducting means 413 and orifice 416 aligns with conducting means 414. The orifices 413, 416 can be filled with conducting paste 415, 419 to enable subsequent electrical connection to be made to conducting means 407 and 408 from external circuitry. The conducting paste 415, 419 may be introduced in to the orifices 412, 416 either before or after pressing and/or firing. As such, an electrical connection can be made by external connections from conducting paste 415 to conducting paste 419 through pad 413, pad 411, conducting element 407, temperature sensitive means 404, conducting element 409, via 406, conducting element 410, temperature sensitive means 405, conducting element 408, pad 417 and pad 414 respectively.

Such an arrangement may connection to external circuitry simpler without unduly affecting the symmetrical temperature response of the sensor 400.

It is of course to be understood that the invention is not to be limited to the details of the above embodiments which are described by way of example only.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A temperature sensor comprising:
a first ceramic substrate having on a first surface a first temperature sensitive means and a first pair of conducting surface elements connected to each end of said first temperature sensitive means;
a second ceramic substrate having at least one conducting via therethrough, said conducting via being aligned with one of said first pair of conducting surface elements; and
a third ceramic substrate having on a first surface a second temperature sensitive means and a second pair of conducting surface elements connected to each end of said second temperature sensitive means, wherein one of said second pair of conducting surface elements is aligned with the conducting via of the second substrate,
wherein the first pair of conducting surface elements is arranged such that a first element of the first pair runs substantially from the first temperature sensitive means to a distal end of the first ceramic substrate, and a second element of the first pair is adapted to be aligned with said conducting via and runs from the first temperature sensitive means to the middle of the first ceramic substrate, and
wherein the second pair of conducting surface elements is arranged such that a first element of the second pair runs substantially from the second temperature sensitive means to a distal end of the third ceramic substrate, and a second element of the second pair is adapted to be to be aligned with said conducting via and runs from the second temperature sensitive means to the middle of the third ceramic substrate.

2. A temperature sensor as claimed in claim 1, wherein the first and third substrates are substantially planar and substantially elongate, both having said temperature sensitive means provided at one end.

3. A temperature sensor as claimed in claim 1, wherein the second element of each pair runs substantially along a center line of their respective substrate to the middle of the substrate.

4. A temperature sensor as claimed in claim 1, wherein the first and second conducting surface elements are provided with connection pads, the connection pads being directly exposed or indirectly exposed.

5. A temperature sensor as claimed in claim 1, wherein the sensor incorporates additional circuitry provided for any one or more of the first, second, or third substrates, the additional circuitry being provided with one or more surface conducting elements and/or associated vias to enable a signal to be output to external circuitry.

6. A temperature sensor as claimed in claim 1, wherein at least one of the first temperature sensitive means or the second temperature sensitive means comprises one or more resistors having a resistance value affected by the local temperature of the first ceramic substrate or the third ceramic substrate, respectively.

7. A temperature sensor as claimed in claim 1, wherein the conducting via is provided substantially at the center of the second substrate and comprises a hole passing through the ceramic substrate, said hole being filled with conducting material.

8. A temperature sensor as claimed in claim 7, wherein the conducting material is platinum.

* * * * *

UNITED STATES PATENT AND TRADEMARK OFFICE
CERTIFICATE OF CORRECTION

PATENT NO.        : 8,333,506 B2
APPLICATION NO.   : 12/512837
DATED             : December 18, 2012
INVENTOR(S)       : Chadvar Kamenov Page 1 of 1

It is certified that error appears in the above-identified patent and that said Letters Patent is hereby corrected as shown below:

On the Title Page:

Item (73) Assignee: Please replace "MELEXIS NV Microelectonic Integrated System, Leper (BE)" with -- Sensor-Nite Industrial OOD --

Signed and Sealed this
Eighth Day of April, 2014

Michelle K. Lee
*Deputy Director of the United States Patent and Trademark Office*